(12) United States Patent
Tomarkin

(10) Patent No.: US 9,535,933 B2
(45) Date of Patent: Jan. 3, 2017

(54) SYSTEM AND METHOD FOR REPRESENTING CHANGE VALUES

(71) Applicant: Acxiom Corporation, Little Rock, AR (US)

(72) Inventor: Craig William Tomarkin, Fairfield, CT (US)

(73) Assignee: Acxiom Corporation, Little Rock, AR (US)

( * ) Notice: Subject to any disclaimer, the term of this patent is extended or adjusted under 35 U.S.C. 154(b) by 251 days.

(21) Appl. No.: 14/464,757

(22) Filed: Aug. 21, 2014

(65) Prior Publication Data

US 2015/0066884 A1    Mar. 5, 2015

Related U.S. Application Data

(60) Provisional application No. 61/994,367, filed on May 16, 2014, provisional application No. 61/873,248, filed on Sep. 3, 2013.

(51) Int. Cl.
*G06F 17/30* (2006.01)
*G06Q 30/06* (2012.01)
*G06Q 30/02* (2012.01)

(52) U.S. Cl.
CPC ..... *G06F 17/30289* (2013.01); *G06F 17/3053* (2013.01); *G06F 17/30312* (2013.01); *G06Q 30/0204* (2013.01); *G06Q 30/0631* (2013.01)

(58) Field of Classification Search
CPC combination set(s) only.
See application file for complete search history.

(56) References Cited

U.S. PATENT DOCUMENTS

| | | |
|---|---|---|
| 6,341,287 B1 | 1/2002 | Sziklai et al. |
| 6,385,616 B1 | 5/2002 | Gardner |
| 6,493,728 B1 | 12/2002 | Berger |
| 7,742,896 B2 | 6/2010 | Ikegami |
| 7,742,959 B2 | 6/2010 | Muller |
| 7,756,676 B1 | 7/2010 | Shan |
| 8,078,655 B2 | 12/2011 | Grubov et al. |
| 8,126,748 B2 | 2/2012 | Sunshine et al. |
| 8,200,614 B2 | 6/2012 | Syed et al. |
| 8,271,426 B2 | 9/2012 | Ramaiyer |
| 8,350,856 B1 | 1/2013 | Nazir et al. |
| 8,571,965 B2 | 10/2013 | Rowell et al. |
| 8,630,856 B2 | 1/2014 | Balchandran et al. |
| 8,694,459 B2 | 4/2014 | Zadeh |
| 2011/0289086 A1 | 11/2011 | Jordan et al. |

(Continued)

OTHER PUBLICATIONS

Mandelbrot, Benoit, The Variation of Certain Speculative Prices, The Journal of Business, vol. 36, No. 4 (Oct. 1963), pp. 394-419.

(Continued)

*Primary Examiner* — Etienne Leroux

(57) ABSTRACT

A method for measuring a change between two values for one or more data elements over time uses a "delta" value to indicate the significance of the change. The delta value is the difference between the two values, added to the ratio between those values multiplied by an asymptote. Experimental data sets with known values may be used to create data sets to which selection criteria are applied in order to calculate an optimal asymptote for the application of the delta values. This optimal asymptote may then be used for calculating delta values across an entire population for predictive purposes.

30 Claims, 12 Drawing Sheets

(56) References Cited

U.S. PATENT DOCUMENTS

| | | |
|---|---|---|
| 2012/0207325 A1 | 8/2012 | Taenzer |
| 2013/0103615 A1 | 4/2013 | Mun |
| 2013/0103658 A1 | 4/2013 | Travis |
| 2013/0110567 A1 | 5/2013 | Omar |
| 2013/0117247 A1 | 5/2013 | Schreter et al. |
| 2013/0179395 A1 | 7/2013 | Heman et al. |

OTHER PUBLICATIONS

Saaty, Thomas L., Time Dependent Decision-Making; Dynamic Priorities in the AHP/ANP: Generalizing from Points to Functions and from Real to Complex Variables, Mathematical and Computer Modelling 46 (2007) pp. 860-891.

Sobel, Michael E., Asymptotic Confidence Intervals for Indirect Effects in Structural Equation Models, Sociological Methodology, vol. 13 (1982), pp. 290-312.

Enable and Disable Change Data Capture (SQL Server), http://msdn.microsoft.com/en-us/library/cc627369.aspx (retrieved May 15, 2014).

missmiis: How to Make SQL Delta Tables, http://www.wapshere.com/missmiis/how-to-make-a-sql-delta-table (retrieved May 15, 2014).

| Consumer Link | Counter | DV_9263 Lines of Credit | DV_9264 (employed or not, sum of 5 adults) "student" | DV_9265 Number of Children | DV_9266 Marital Status (treat as binary, married) | DV_9267 Number of Adults | DV_9268 Household Size | DV_9269 Generations in HH | DV_9270 Population Density |
|---|---|---|---|---|---|---|---|---|---|
| ....1293 | 1 | J2P711 | | | | | | | F1P0102 |
| ....1293 | 2 | D1P100 | | | | | | | |
| ....2878 | 1 | A3P711 | | | | | | | A3P1314 |
| ....0121 | 1 | | | H2M033 | H2M1 | H2M244 | H2M323 | H2M324 | |
| ....3210 | 1 | | A3P10 | A3P033 | A3P1 | A3P115 | A3P416 | A3P212 | |
| ....1651 | 1 | | C3P40 | C3P133 | C3P1 | C3P050 | C3P050 | C3P133 | |
| ....1651 | 2 | G1M100 | | | | G2M050 | G2M050 | | |
| ....1651 | 3 | | | | | D1P050 | D1P050 | | |

Fig. 9

| Audience Transition element | New IBE value | Old IBE value | Description |
|---|---|---|---|
| DV_IB9343 (i.e. 'A3P045') | New_IB8671 (i.e. $50,000) | Old_IB8671 (i.e. $35,000) | Example values |
| DV_HOHH | new_HOHH | old_HOHH | Head of Household |
| DV_Active | new_active | | Active, not Deceased or Missing |
| individu | | | sort key: Consumerlink |
| counter | | | sort key: counter of number of change records |

SYSTEM AND METHOD FOR REPRESENTING CHANGE VALUES

CROSS-REFERENCE TO RELATED APPLICATIONS

This application claims the benefit of U.S. provisional patent applications No. 61/873,248, filed on Sep. 3, 2013, and entitled "System and Method for Calculating Values Representing Magnitude of Change Based on Significance," and No. 61/994,367, filed on May 16, 2014, and entitled "Delta Database." Such provisional applications are incorporated by reference as if fully set forth herein.

STATEMENT REGARDING FEDERALLY SPONSORED RESEARCH OR DEVELOPMENT

Not applicable.

BACKGROUND OF THE INVENTION

The art includes a number of computerized systems and methods for calculating values representing the magnitude of change (or difference between values) based on their relative strength or significance in various applications. Three of the most common methods are the difference between two numbers, index, and Z-scores.

In an absolute value comparison, the change in value is used to rank values without any modifications to the absolute value of the change. For example, suppose that it is desirable for marketing purposes to track changes in the income of a consumer over time. If a consumer's income increases from $25,000 per year to $50,000 per year, this has an absolute value change of $25,000 during that timeframe. The use of absolute values is of limited utility in many applications, including marketing, because the absolute value of the change may or may not correlate to an event of marketing significance. In the case of the consumer whose income changed from $25,000 to $50,000, a significant change has indeed occurred, and marketing efforts should be redirected accordingly. Consider, however, the case of a consumer whose income changes from $1,025,000 to $1,050,000 over the same time period. While the absolute value of income change is the same as in the previous example, this change is likely insignificant for marketing purposes. Thus measuring the absolute value of a change, such as change in income, is not a useful measure of significance for marketing and many other purposes.

An index ranking measures the relative strength of a relationship as a percentage. Using the example above, the consumer whose income changed from $25,000 to $50,000 experienced a 100% increase in income over the time period. The consumer who experienced a change from $1,025,000 to $1,050,000 experienced only a 2% change in income. The use of an index ranking thus better captures the significance of the change in this case. The use of index ranking, however, also presents a number of drawbacks. A doubling of income may represent the same percentage change, but may have a different significance for persons earning $5,000, $50,000, or $5,000,000. Indexes contain no information about sample size, or whether the index is statistically significant. Thus insignificant changes may be ranked very highly if index ranking is used. In addition, index measures are not necessarily symmetric, that is, they not scale equally in both directions; a percentage index can increase by any amount, such as for example a 300% increase, but the most that an index percentage can decrease by is 100%.

A Z-score (also referred to as a "standard" score) measures the number of standard deviations an observed data point varies from a mean data value. The Z-score is calculated by subtracting the mean from an individual raw (absolute) score, and then dividing the difference by the standard deviation for the overall data set. Z-scores are useful for showing statistical significance, but the simple fact that a particular value has statistical significance does not necessarily mean it is predictive of behavior, which is desirable for many applications, including marketing. Also, Z-scores can only be used on sets of different samples; they cannot be used longitudinally on the same sample. They are thus of limited utility for many such applications.

Given the limitations in the various ranking systems described above for finding significance and for ranking, an improved ranking method that better identifies significance, scales equally high or low, and has positives values for increases and negative values for decreases, is desirable. In particular, it would be desirable to develop a ranking method that combines the predictive qualities of index ranking with the quality of Z-scores of only showing large values when coverage is significant.

The inventors have recognized that databases that include a measure of change may be useful in the improvement of systems that use historical data. Historical data is difficult to compile into an easy-to-use and "lightweight" data structure. This is especially true when tracking many data elements at the same time. For example, in a database containing information about a large number of households or consumers in a particular geographic area, a move, marriage, new birth, automobile purchase, and other such occurrences each create a new record with multiple details regarding each event. The result is a common problem in "big data" where there are very many records across time, to the extent that at some point the data becomes unmanageable even for more advanced and powerful computing systems. For some parties that maintain such databases, the sheer size of historical or "longitudinal" data becomes so large that it must be archived, and is thus no longer effectively used in marketing, business analytics, or other desirable applications. It would be desirable to transform this data from a set of previous state values and new state values into change values, since the result would be a much smaller footprint that would be more manageable.

References mentioned in this background section are not admitted to be prior art with respect to the present invention.

BRIEF SUMMARY OF THE INVENTION

The present invention is directed in certain aspects to a ranking method and method for measuring change calculated using first and second values for a particular data element, the difference between those data values, and an asymptote of those ratios. The present invention results in a ranking value method that captures the significance of a change rather than simply the absolute value of that change, which is important for many applications, including without limitation marketing. In addition, the ranking value of the present invention is particularly well adapted to, but not limited to, application with historical or longitudinal data. The invention in certain aspects further is directed to an automated method for determining a best asymptote for calculations involving the change values based on the type of data for which the values are being calculated.

These and other features, objects and advantages of the present invention will become better understood from a consideration of the following detailed description of certain embodiments and appended claims in conjunction with the drawings as described following:

BRIEF DESCRIPTION OF THE SEVERAL VIEWS OF THE DRAWINGS

FIG. 1 is a chart showing a first example of ranking according to certain embodiments of the present invention.

FIG. 2 is a chart showing a second example of ranking according to certain embodiments of the present invention.

FIG. 3 is a chart showing a third example of ranking according to certain embodiments of the present invention.

FIG. 4 is a chart showing a fourth example of ranking according to certain embodiments of the present invention.

FIG. 7 is a chart showing the use of delta values to "bucket" changes related to consumer relocation based on example data according to certain embodiments of the present invention

FIG. 9 is an example of a delta database constructed according to certain embodiments of the present invention.

FIG. 10 is a new value comparison according to certain embodiments of the present invention.

FIG. 14 is an example data set constructed during the selection of an appropriate asymptote according to certain embodiments of the present invention.

DETAILED DESCRIPTION OF THE PREFERRED EMBODIMENT(S)

Figure 5:
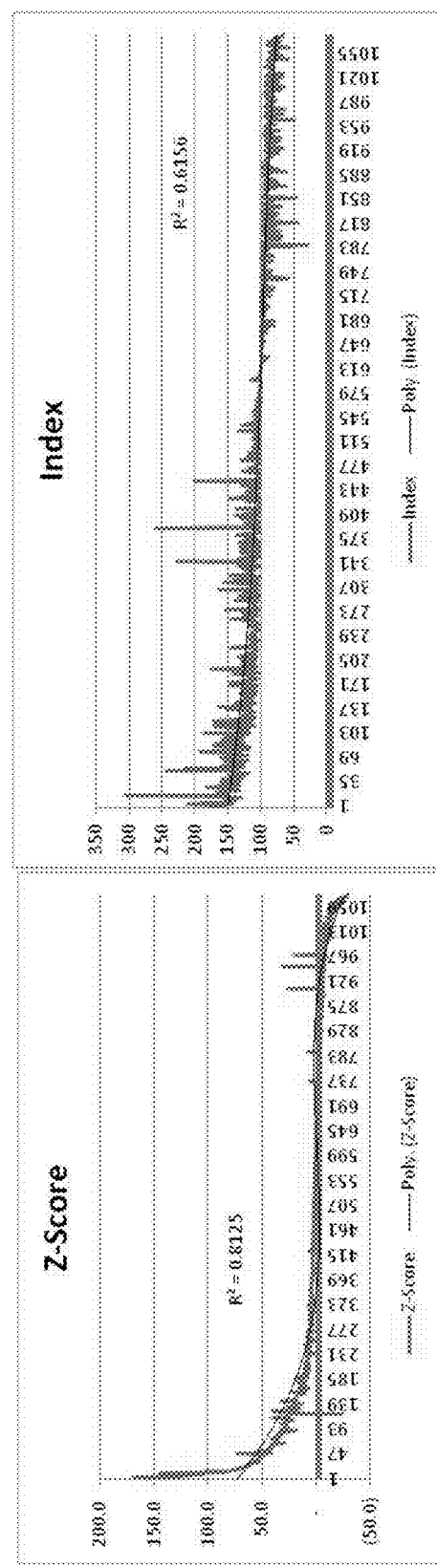
FIG. 5 is a chart showing the correlation of delta values to Z-scores and index ranking using a set of example data according to certain embodiments of the present invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In certain embodiments the present invention is directed to a computerized ranking system method for determining significance, identified herein as a "delta value." The calculation of the delta value, performed by specialized software executing on one or more microprocessors, has three components: (1) the difference between first and second values (a "new" and "old" value, or a "target" and "reference" value or simply first and second value); (2) a ratio of the lower value to the higher value; and (3) the asymptote of the ratios, where the asymptote value ranges from 100% down to a limit, such as 80% or even 0%. The formula for calculating delta values may be stated as:

$$\text{Delta} = (N-O) + (1-a)*(L/H)*(O-N)$$

where:
N=new value
O=old value
a=asymptote
L=lower absolute value, keeping the sign in the equation
H=higher absolute value, keeping the sign in the equation This mathematical formula is applied for calculating a delta value whenever a positive value is compared to a positive value or a negative value is compared to a negative value; when a negative value is compared to a positive value, no adjustment is calculated; rather, the delta value is simply the absolute distance between the values. Examples of the application for this calculation include consumer data, which may be various types of data collected about consumers and maintained for marketing purposes.

It may be seen that the left-hand part of the expression in the delta value equation represents the difference between the new and old values, while the right-hand part of the expression represents the compression, whereby higher values are compressed more relative to lower values. The result is a value that combines desirable qualities of both index percentage ranking and Z-scores in a single score. This score can then be applied to many uses, such as software-based ranking of consumer characteristics that are important for marketing purposes.

The delta value calculation according to certain embodiments of the present invention is particularly useful for ordering changes in value into a sequence from high to low (or low to high), where there are ties involved when the data is unadjusted. Problems can be longitudinal in nature on the same sample, or comparing values across different samples. Consider the example of two people who each gain 50 pounds, but one is a child increasing from 50 to 100 pounds, and the other is an overweight adult increasing from 400 to 450 pounds. The delta value for this data will reflect that the "impact" of the child's gain of 50 pounds was greater than the impact of the overweight adult's gain of 50 pounds. The degree to which the adjusted amount deviates from 50 is based on the ratio asymptote chosen for the project, where the closer the asymptote is to 1, the less adjustment. In this example, an asymptote of 0.95 yields Delta Values of 48.74 pounds and 47.78 pounds respectively, while an asymptote of 0.50 yields 37.50 and 27.78 pounds. If a third person gains 50 pounds starting from zero pounds (at conception), the delta value is 50.00 regardless of the asymptote. This is because there is no compression starting from zero. The farther from zero the starting value lies, the more the difference is compressed. If the purpose of applying delta values is to break ties for rank ordering, then a higher asymptote should be used, such as a value of 0.99

Turning to change data that might be presented in a marketing database pertaining to a universe of consumers and/or households, one may consider as an example the following cases, where the data involves a change in the square footage of the house owned by a particular consumer:

Case 1: old value=500 sq. ft., new value=1000 sq. ft.
Case 2: old value=4000 sq. ft., new value=4500 sq. ft.
Case 3: old value=1000 sq. ft., new value=500 sq. ft.
Case 4: old value=4500 sq. ft., new value=4000 sq. ft.
Case 5: old value=−500 sq. ft., new value=−1000 sq. ft.
Case 6: old value=−2000 sq. ft., new value=4000 sq. ft.

Applying the above method for calculating delta values to the first five cases, with varying asymptotes ranging from 0.0 to 0.99999, results in the following delta values:

TABLE 1

| asymptote | 0.00 | 0.10 | 0.20 | 0.50 | 0.80 | 0.90 | 0.95 | 0.99 | 0.99999 |
|---|---|---|---|---|---|---|---|---|---|
| case 1 | 250 | 275 | 300 | 375 | 450 | 475 | 487.50 | 497.50 | 499.9975 |
| case 2 | 56 | 100 | 144.44 | 277.78 | 411.11 | 455.56 | 477.78 | 495.56 | 499.9956 |
| case 3 | (250) | (275) | (300) | (375) | (450) | (475) | (487.50) | (497.50) | (499.9975) |
| case 4 | (56) | (100) | (144.44) | (277.78) | (411.11) | (455.56) | (477.78) | (495.56) | (499.9956) |
| case 5 | (250) | (275) | (300) | (375) | (450) | (475) | (487.50) | (497.50) | (499.9975) |
| case 6 | 6,000 | 6,000 | 6,000.00 | 6,000.00 | 6,000.00 | 6,000.00 | 6,000.00 | 6,000.00 | 6,000.0000 |

For example, the calculation for case 1 with an asymptote of 0.80 is (1000−500)+(1−0.80)*(500/1000)*(500−1000) =450. For case 6 the asymptote is irrelevant, as the value is always the absolute difference of 6000.

It may be seen from Table 1 that for cases 1 and 2 the actual increase was 500 for both, but since case 1 had a larger percentage change, its delta value was larger. Also it may be seen that the results for case 1 and case 5 are the same, other than the negative value, thus demonstrating the symmetry property of the delta value calculation. The choice of asymptote may be made based on identified characteristics in the underlying data set.

Figures 1, 2:
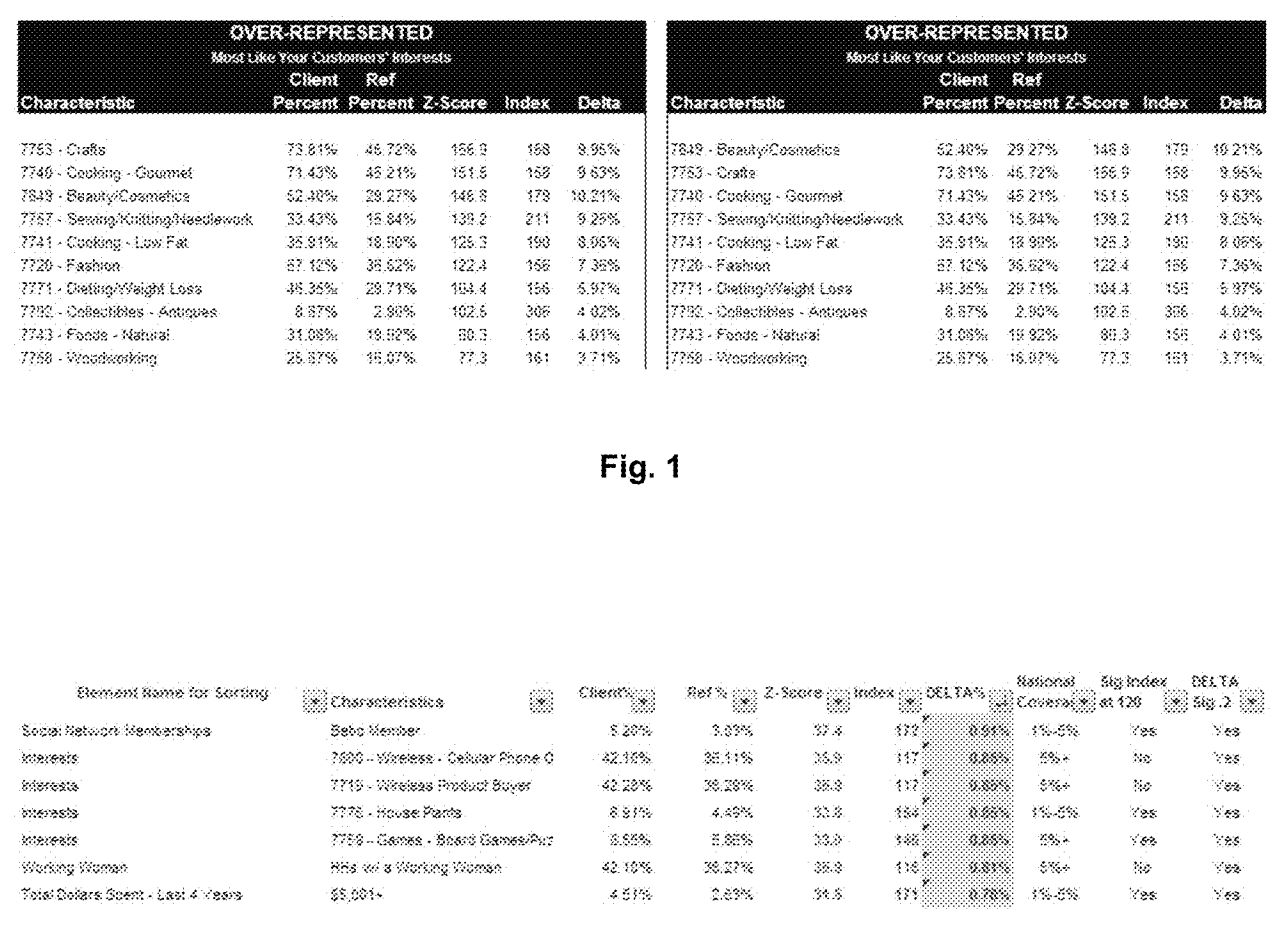

Further examples of the results of delta value calculations are shown in FIGS. 1-4. In FIG. 1, various characteristics or interests of a set of consumers are ranked based on similarity to a particular retailer's customers' interests. This type of ranking is valuable for the identification of likely new customer prospects for the retailer. The sorting by delta values results in a different ranking than the sorting by Z-score because results with higher index rankings tend to rank higher when delta values are used. In the example of FIG. 1, this pushes the "beauty/cosmetics" category to the top spot in the delta value calculation, although it was ranked third on the Z-score ranking. It may also be seen though that the category with the highest index ranking is at the top in neither of the other ranking systems, since it has lower overall coverage in the reference group, thus showing the manner in which the delta value takes into account this aspect of the data as well.

The data of FIG. 2 further illustrates how index values may be misleading because they do not consider sample size; large index scores are generated with respect to very small reference group coverage, but the delta value ranking inherently adjusts for this circumstance. In this case again, various consumer interests are ranked using example data according to index ranking, Z-scores, and delta values for comparison.

Figures 3, 4:
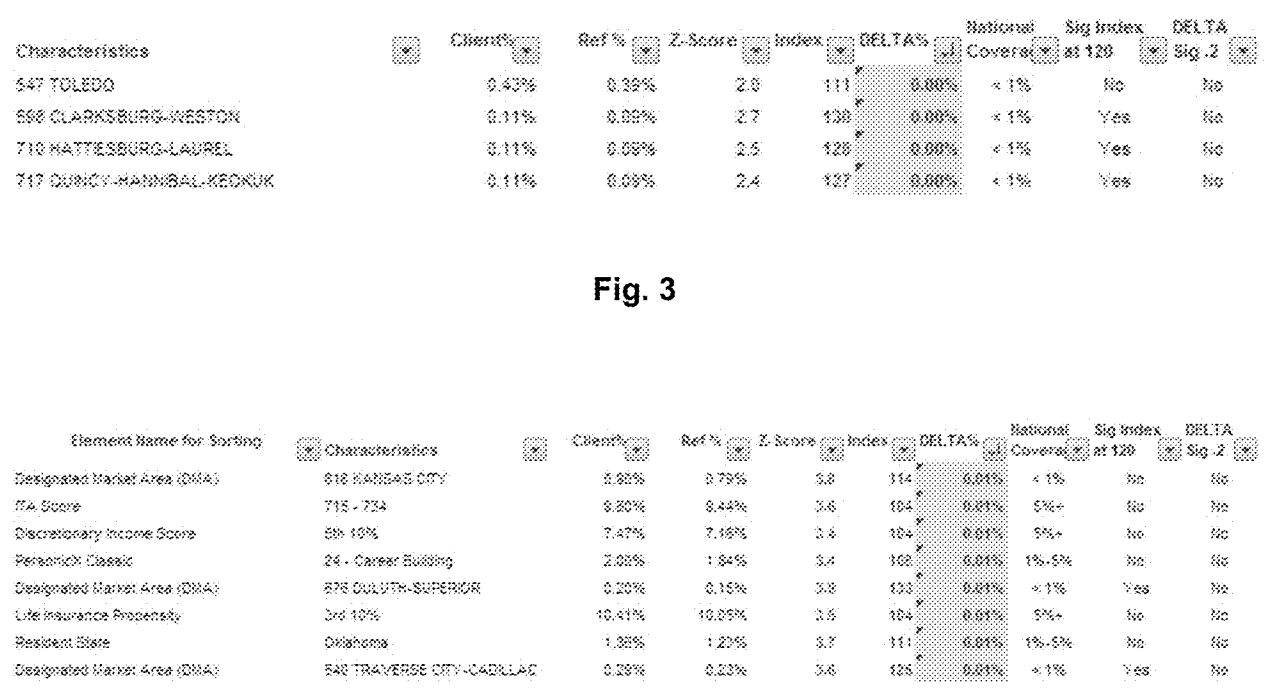

FIG. 3 applies delta values to a comparison between the percentage of a retailer's customers who reside in particular metropolitan areas (the "client %" column) against the percentage of the total U.S. population that resides in those metropolitan areas (the "ref %" column). This data may be used, for example, to determine of a particular retailer's customers are more likely to live in a small town or rural area than the population as a whole. As previously noted, delta values can be applied, as here, to data that his not historical or longitudinal, but rather is instead simply a change measurement between two numbers. Thus the terms "old value" and "new value" as applied in the algorithm for delta values includes cases where the two different values are not literally an earlier and later measurement of the same data, but instead are simply two different values used for comparison, as in this case. This data set illustrates how index ranking can yield "false positives" when coverage is very low; despite relatively large index ranking scores, as shown in the "Index" column of FIG. 3, the delta values for these characteristics are within rounding error of zero. The reason is that these metropolitan areas represent a very small proportion of the total population, as shown in the "National Coverage" column.

FIG. 4 illustrates the opposite problem of Z-scores as compared to the data of FIG. 3. The data used here is a set of consumer characteristics, with the "Client %" column indicating the percentage of the retailer's customers who exhibit this particular characteristic, and "Ref %" being the percentage of consumers who exhibit this characteristic across the U.S. population. In this case, the characteristics generate very high Z-scores (a score greater than 3 indicates statistical significance), but because the indexes are so low these values are not predictive. The delta value calculation accounts for this, resulting in very low delta value scores for these characteristics, thus properly reflecting the significance of these differences.

Turning to FIG. 5, these two graphs illustrate how closely the delta value calculations track Z-score and index ranking calculations for a sample data set. As can be seen, delta values track Z-scores more closely than index ranking because the index ranking results in more "false positives" on the chart (graphically shown by spikes) to the right of FIG. 5.

Figure 6:
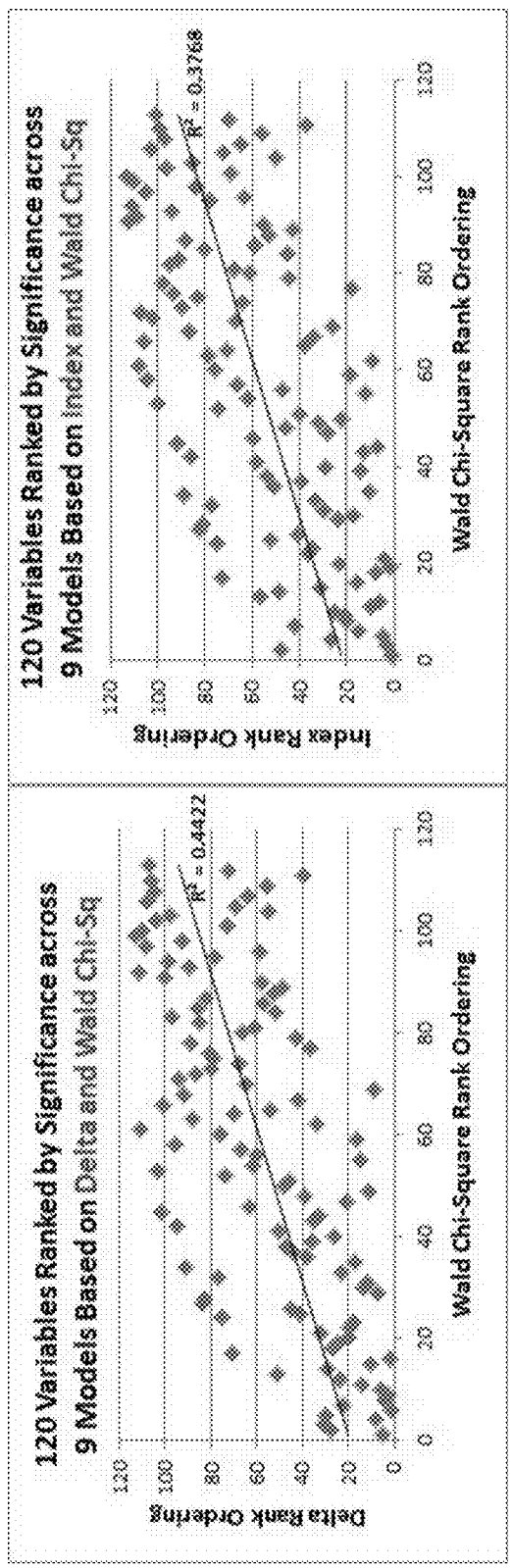
FIG. 6 is a chart showing Wald Chi-Square distributions for delta values and index ranking using a set of example data according to certain embodiments of the present invention.

FIG. 6 illustrates Wald Chi-Squares for delta values and index ranking for a sample data set. Wald Chi-Squares are a well-known test of significance for each variable in a model. The higher the value, the more significant each variable is demonstrated to be. As can be seen (and shown by comparing R-Squared values), delta values appear to be more predictive than index ranking based upon these results.

Figure 7:
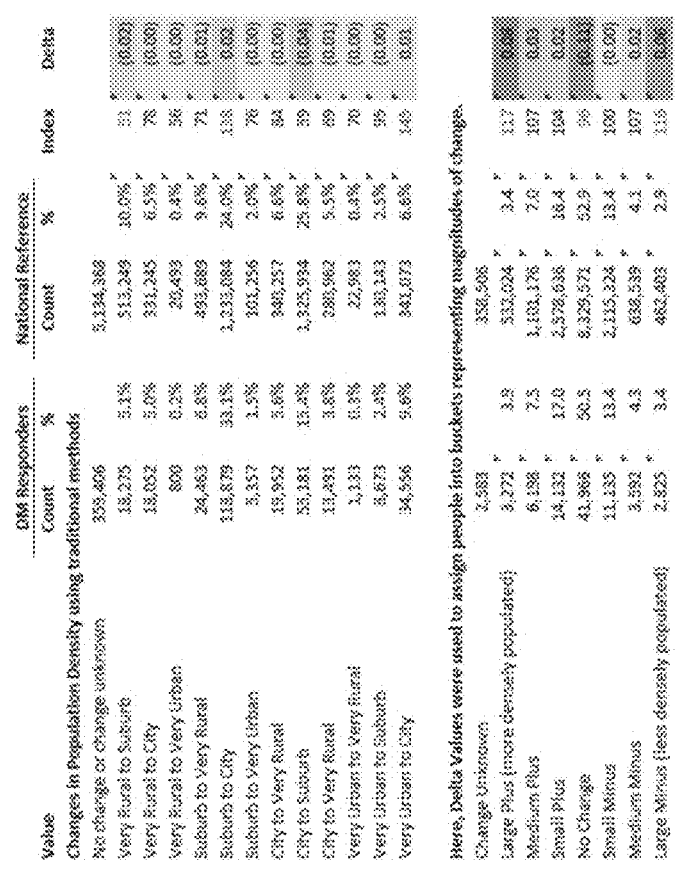
Figure 8:
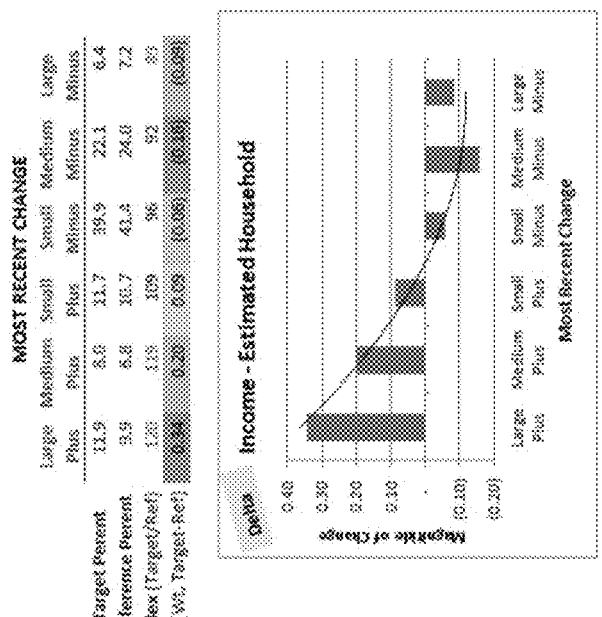
FIG. 8 is a chart showing the use of delta values to bucket changes related to household income based on example data according to certain embodiments of the present invention.

FIGS. 7 and 8 illustrate two examples of how delta values may be used to create "buckets" of change, that is, categories or bands that allow analysis of certain data. In FIG. 7, the illustrated data relates to relocations by consumers, with the buckets indicating the starting and ending location as a measure of population density. FIG. 8 illustrates bands for changes in income for consumers. In each case, it may be seen that by grouping delta values that are calculated for the related data into bands, the resulting buckets may be used for later analysis. In FIG. 7, for example, the "large plus" bucket is the largest based on delta values, which is a grouping of changes that show a move from one location to another location with a significantly higher population density. In FIG. 8, the "large plus" category also appears most significant based on delta values, in this case being large increases in household income for consumers in this bucket. As shown in the bar chart of FIG. 8 that distributes these buckets from "large plus" to "large minus," the largest positive difference for this retailer is shown for large income increases, and generally lower delta values for smaller increases, with the delta value becoming negative for decreases in income. This follows a familiar pattern in retail, indicating that those persons experiencing increases in income may be more likely to purchase certain types of products, and less likely as their income increase is less pronounced or even be less likely than the general population to purchase these types of products in response to a decrease in income.

In certain embodiments set forth above the delta values are directed to the general business function of marketing, but the invention is not so limited. Various embodiments may be used by data scientists, statisticians, analysts, researchers, and data-driven decision makers in any industry, marketing executives of public and private corporations, consulting professionals, and account executives with partner organizations working with a company. The data used may be defined to include all longitudinal data, data comparing samples or populations, change data, ranking data, temperatures, and currency data, as non-limiting examples.

It may be seen that delta values provide an effective alternative to reporting by means of index and z-scores for many applications. Delta values may be used to evaluate the predictive value of data elements in a customer database. Delta values allow a user to quickly identify trends in data without the need for a regression model. Less data is needed for modeling, and the user may create a data product that displays values comparing populations to each other or changes over time in a more meaningful way than previously possible. Longitudinal analysis using delta values may include, for example, identifying why a customer subscribes to or cancels a service in response to life stage changes. Delta values may also be an effective means of identifying customers who have moved from a location near one dealer or franchisee of a retailer and nearer to another dealer or franchisee, in which case the customers may be contacted to introduce the new dealer or franchisee to the customer. Delta values may allow for better prospective customer targeting by identifying those consumers who are experiencing a change that may correlate to a desire or need for a particular product or service; for example, a brokerage firm may wish to identify those persons whose income or net wealth is increasing, or a subscription service may wish to identify those persons whose income has decreased to a lost job or other adverse factors in order to reach out to those customers with a discount offer to retain their business. In addition, a user may develop a new product or service based on life stage change data as reflected with delta values, in order to best provide a product or service that is matched to its customer's needs.

It will be understood from the foregoing discussion that the selection of the appropriate asymptote will depend upon the nature of the data from which the delta values are being calculated and the desired results. In some cases, the best asymptote may be easily determined, such as setting the asymptote to values such as 0.99 when the purpose is merely to break ties when delta values are being used in a recommendation engine. In other cases, such as prediction optimization, the appropriate asymptote may not be readily apparent. The selection of the asymptote in such cases may be performed through an automated process according to certain embodiments of the present invention, the process being illustrated by the flow chart of FIG. 13. In an illustrative example, suppose that the goal of using the delta values calculations is to predict how much money a population of individuals may spend on food during a certain period based on changes in the weight of those individuals. Consider further that there is existing data for the amount of money spent during the relevant time period for 20 persons in the population, as well as the starting and ending weight of those persons. In addition, it is known that for a much larger sample of people in this group, the average amount spent on food over the period was $35.00. Using this experimental data set, it is desired to select the best asymptote for use in calculating delta values for a more general prediction of spending on food expenditures in the population based on weight change.

Figure 13:
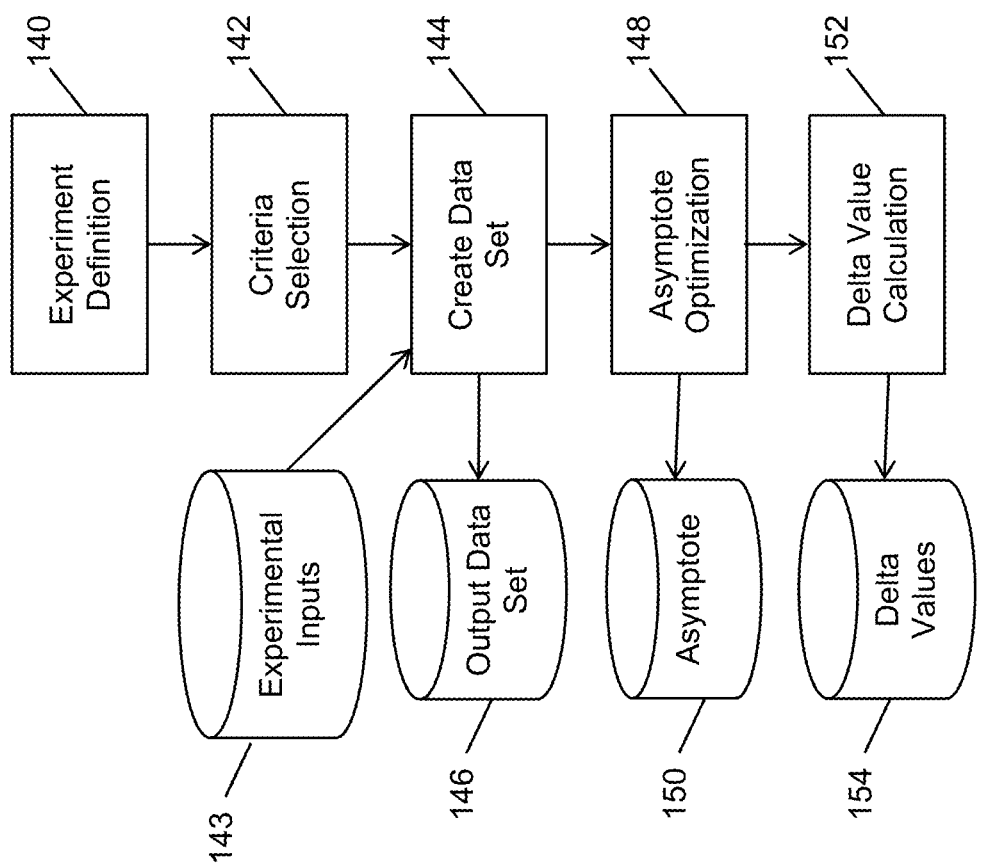
FIG. 13 is a flow chart depicting the steps in the automated method for selecting an appropriate asymptote according to certain embodiments of the present invention.

At step 140 of FIG. 13, the experiment is defined. In this case, the experiment is intended to optimize the choice of asymptote value given the constraints of solving for the amount spent on food based on changes in weight. At step 142, measurement criteria for the asymptote are chosen. In the present example, since the objective is to optimize a continuous function, a Least Squares method was determined by the optimization rules to be the best choice. Depending upon the objectives, however, any of a number of other error measurement statistics may be applied. For example, if the goal is to predict a binary outcome or have data with large outliers, a different method may be preferred. As such, a set of rules programmed into the computer executing this method includes the capacity to select the most appropriate measurement across a variety of such circumstances.

Figure 14:
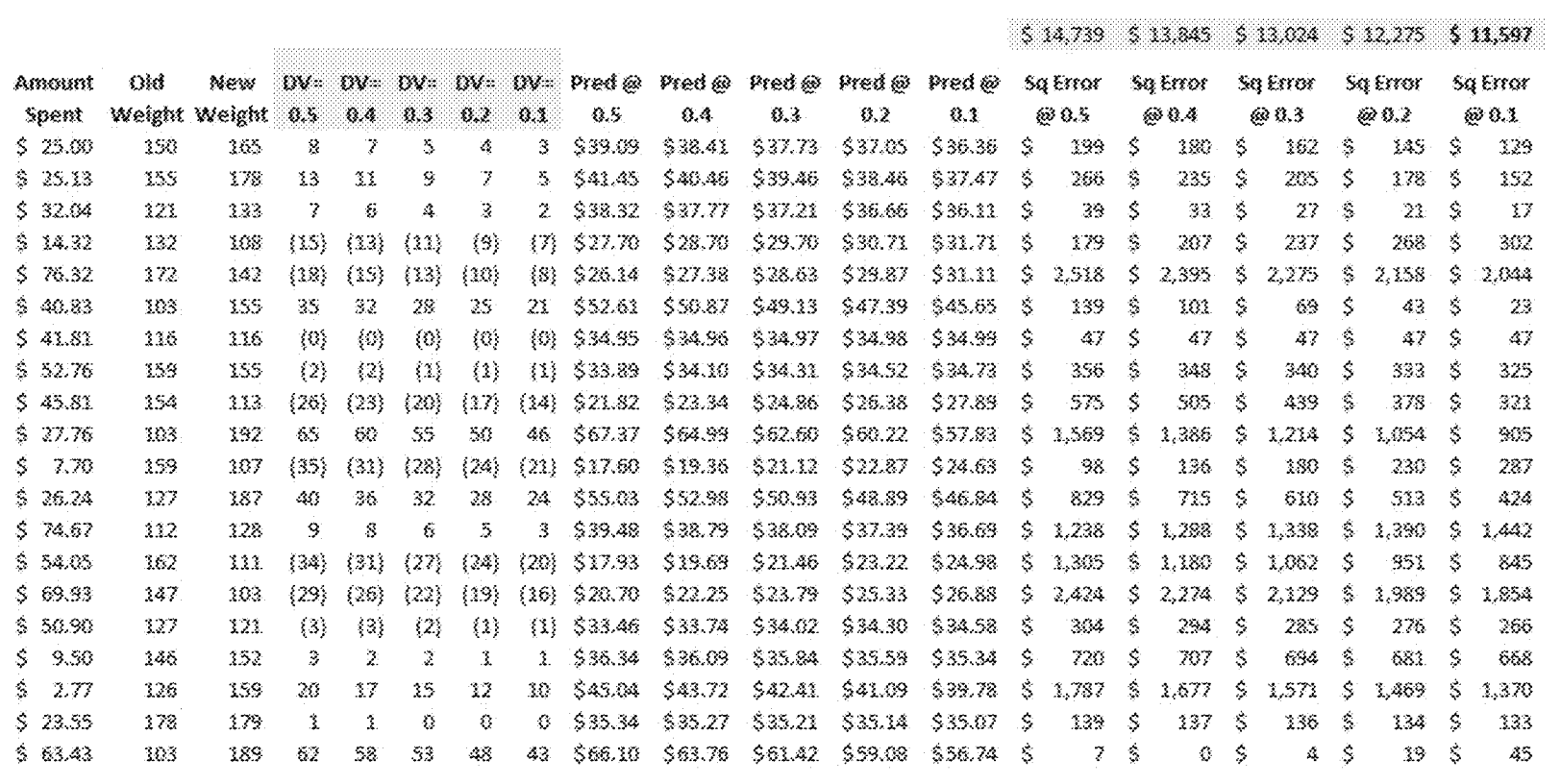

At step 144, a data set is created using the experimental input data 143. In this case, the experimental input data is the amount spent on food, the starting weight, and the ending weight for the 20 persons in the experimental group. Using this input data, the result is output data set 146. A sample data set for this example is shown in FIG. 14. The first three columns show the data from experimental inputs 143, and the remainder of the data is calculated at create data set step 144 and contained in output data set 146. The fourth through eighth columns show delta value results for the asymptote selections of 0.5, 0.4, 0.3, 0.2, and 0.1, respectively. Other potential asymptote values could be used in the experiment in other embodiments. Using these delta values, a predicted amount of money spent on food during the experimental period may be calculated, which is shown in the ninth through thirteenth columns of the table of FIG. 14. Using the selected method of Least Squares, the error associated with each asymptote selection is shown in the fourteenth through eighteenth columns of the table. The Least Squares calculation represents the least sum of the squares of the differences between the actual amount spent on food during the relevant period and the predicted amount, based on the calculation.

At step 148, the optimal asymptote is selected based upon the calculations performed at create data set step 144 and reflected in the table of FIG. 14. In this case, it will be seen that the asymptote of 0.1 results in the smallest error from the experimental results. This optimized asymptote is then written to asymptote storage 150, which may be a meta dataset corresponding to the experimental requirements.

Once the optimal asymptote has been selected, delta value calculations are performed across the entire data set, which in this case is the entire population of persons for which the data regarding weight change has been recorded, with the goal of predicting food expenditures during the period. The resulting data values are written to a delta values data store 154.

Delta values as described above or other numeric measures of change may be used to create a lightweight database, which in certain embodiments is based on historical or longitudinal data but is not so limited. Such a database will be referred to herein as a delta database, regardless of whether the measure of change used in the database is a delta value as described herein or another type of change data. In a delta database, historical or longitudinal data, for example, is converted into change data, adding value through this analytic transformation. Rather than use a commonly employed concept of reporting letters to represent old and new values, such as A_H for data indicating that a consumer is moving from an apartment to a house, the construction method for the delta databases converts such data to numeric values, represented in certain embodiments, but not all embodiments, with delta values. This makes the data ready for analytics and other types of numerical calculations without needing further transformation (although further transformations may be performed). The previous and current value pairs are also preferably retained in this master database in order to ensure no information is lost, even though such data may be dropped during an analytic stage.

To indicate a change, the method according to certain embodiments for constructing the delta database uses a space-saving value storage method in which data is stored in a record, and more preferably concatenated into a single string. In various embodiments, the concatenation contains characters/digits representing a date, a direction of change, and a change value. For example, in a certain embodiment a string representing a certain change may take the form "A3P050." In this example, the associated date is represented by the first two characters, a letter and a one-digit number. The first character is a letter from A to L, representing the 12 months from January to December. The second character is the year stored as a single digit, indicating the final digit of the applicable year. For example, 2013 would in this case be represented as "3." The third character is a letter "P" or "M," representing either a positive or "plus" or a negative or "minus" change, respectively. Letters P and M were chosen in certain embodiments in lieu of symbols such as "+" and "−" to avoid confusion for programmers; however, the use of these letters instead of other symbols is not a requirement. The final digits (in this case, 3 digits) are the change value (in this case, a delta value) corresponding to this data element. As explained above, the delta value is a predictive score like an index, but only has large values when coverage is significant, similar in that way to z-scores. Thus in this example, the string indicates a change that took place in January 2013 that was in the positive direction and had a delta score of 50. In various other embodiments within the scope of the invention, other date data could be retained, such as whatever level of time is relevant, including day, hour, minute, and/or second. Any number of digits comprising characters or numbers may be used in representing the data and/or the direction. The number of numeric digits used to store the change value in the string may be any number, depending upon the application, and as previously noted, the delta database is not limited to delta values, and may include any measure of change as a part of this string. In other embodiments, the various components of the record that contains the change value may not be concatenated, and may, for example, be stored in a more traditional record comprising multiple fields.

The method described makes the data stored in this manner easy to use for analytic purposes. This is because a critical step in the analysis of data is to transform the old and new values into a numeric representation of the magnitude of change (or difference) between them. The way the magnitude of change is represented is significant as well. In certain embodiments, the value of "change" relies on a more predictive way to measure the magnitude of change than previously known, using delta values. This method is very lightweight yet retains nearly 100% of the relevant information.

In certain embodiments, the method of constructing a delta database using delta values (or other change values) employs a "master file rollup" strategy. The key is that most recent changes across all elements need to be rolled up to a single record. This compresses the data to, in various examples, one tenth the file size and makes the data extremely accessible. Subsequent longitudinal changes are stored on optionally available supplemental records. These supplement records are identified with a "counter" field. The roll-up operation to construct such a delta database may be performed over a regular time period, such as, for example, monthly. In other embodiments, the roll-up operation may be performed more or less frequently, or may be performed in real time as new data is received. The roll-up operation may be performed at a time period that matches the updates in the associated historical or longitudinal database.

FIG. 9 provides an example of how a delta database may be constructed according to certain embodiments, with each row indicating a particular record or set of records. In the left-most column, an identifier is stored that uniquely identifies a particular entity, for example, a consumer. In certain embodiments, the identifier may be an AbiliTec link as used by Acxiom Corporation for the identification of records related to consumers and households. The other columns show various characteristics related to these consumers, and for each column where there is a change a concatenated string is stored, which is constructed as explained herein. It may be seen that a database constructed in this manner results in a far smaller footprint than a database that retains all of the historical or longitudinal data that underlies the change, yet the key information needed for analytics and other purposes is contained in this relatively small data set. This database is thus small enough that it can be used for analytics, whereas databases that retain all of the historical value continue to grow at a linear pace and become so large that are not effectively usable other than for archival purposes. Even with this reduced footprint, the delta database may still be so large that it is more accessible if stored in multiple partitions, such as ten different partitions that are optimized for parallel processing.

It may be seen in the example of FIG. 9 that more than one row may correspond to a single consumer identifier, each row being delineated from the others by a counter field, which in certain embodiments is a numeric field but in alternative embodiments may be stored as a character value if space is limited. This allows the delta database to track multiple changes in values that occur with respect to the same field over time. In the example of the identifier ending in "1651," counter 3 corresponds to an increase in household size that was recorded, counter 2 corresponds to someone moving out of the household, and counter 1 corresponds to a person moving back into the household. By tracking these changes with multiple rows each delineated by a counter, it is possible to perform analysis of the data that would not otherwise be possible. For example, with this type of data it would be possible to readily construct a list of "empty nest" households, which may be of significant value for marketing purposes since those persons in empty nest households have common purchasing characteristics that distinguish them from other groups. Identifying such households would allow a retailer to focus its marketing message to only those persons more likely to be interested in that marketing message, thereby improving its response rate, while simultaneously benefiting consumers since those consumers unlikely to be interested in the marketing message would not receive it, while those most likely to be interested in the message are those most likely to receive it. Other applications include the ability to measure cumulative change, such as the sum of changes to income over time, or the ability to measure how frequently changes take place, such as identifying frequent movers.

In various embodiments, the invention may be used in any application requiring the comparison of samples or populations to each other. The invention may be used in any field requiring the use of predictive analytics, or any field requiring the ability to rank order items, in particular "recommender" systems such as best offer, next best product, and next best action systems. The invention may be used in any field requiring the sorting of items where the values representing those items changes or has changed; examples include quantifying changes in temperature or rainfall or atmospheric pressure, such as for global climate change; quantifying changes in time, such as comparing speeds of different entities or how long something takes under different conditions; quantifying business opportunities, such as comparing changes in revenue for a company or differences in revenue between companies; measuring magnitude of change in stock prices for companies over time or compared to each other over the same time period; evaluating the magnitude of change in growth or decline in cancer cells or sizes of tumors within a host or relative to other individuals; evaluating crop growth and decline, such as by country or region or by crop type, and changes in blood pressure or other vital signs, especially where the increase or decrease needs to be on the same scale. In addition, the invention in certain embodiments may be used where it is desired to know whether the relative magnitude of a change between two values is significant. For example, this may include a measure showing the change in the size of a cancer tumor, or whether an investment has a return that passes a certain investment threshold. These are only certain examples that may be applied across various fields of endeavor.

The table of FIG. 10 shows an application of the delta database that associates a string with a new value and an old value stored in the same database along with a description field. The structure of this database will be further explained below in the creation of "foundation" and "change" files from which the delta database may be created. It may be noted that in alternative embodiments, one may need only the new or old values, because the user could back into the other value using the change value calculation formula and asymptote if they are known. The counter field is shown in the last row of the table of FIG. 10.

Figure 11:
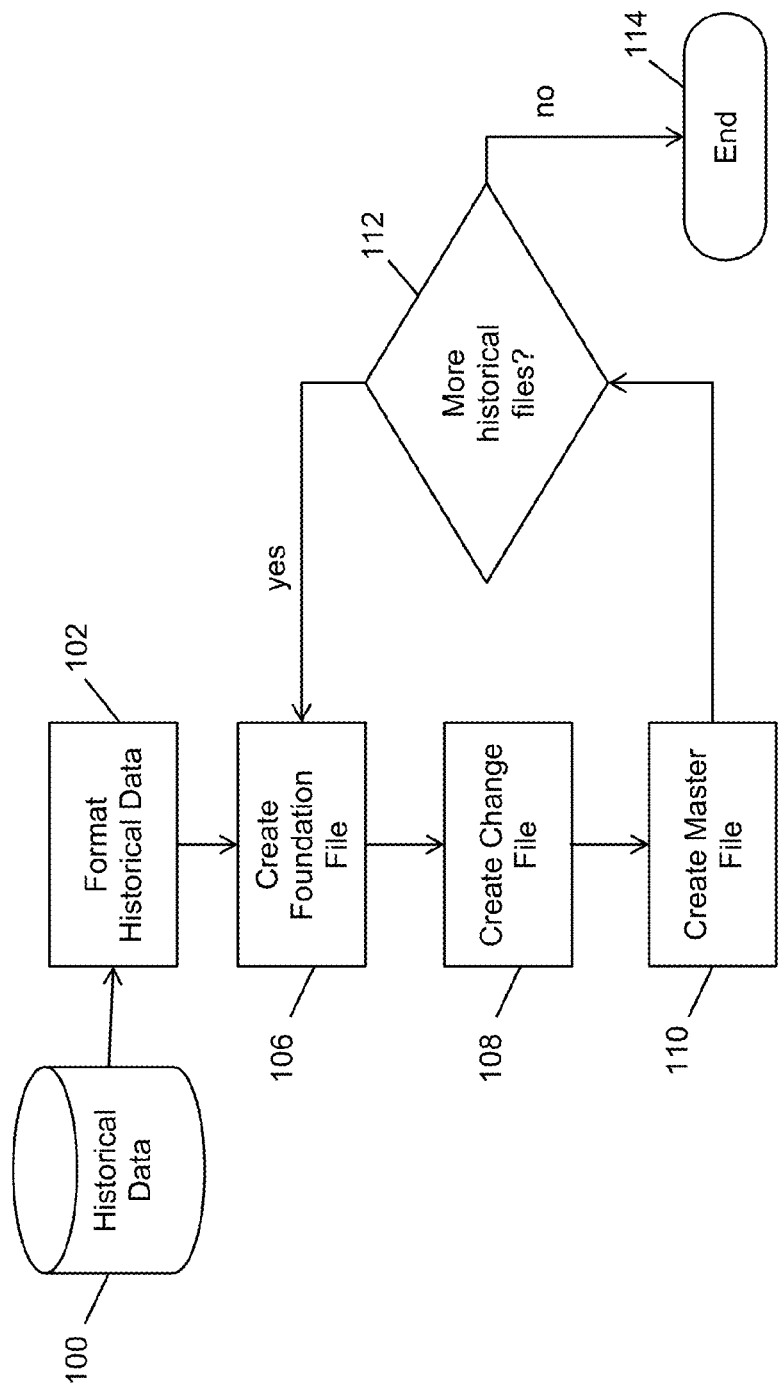
FIG. 11 is a flow chart depicting the steps in constructing a delta database according to certain embodiments of the present invention.

A process for converting a historical data database into a delta database with change data as shown in FIG. 10, where such change data may include but is not necessarily limited to delta values, may begin with the formatting of the historical data 100 as similar data sets, as shown at step 102 in FIG. 11. Each set in certain embodiments should have a common unique sort key, which may be a customer identifier in certain embodiments. This is used to merge the data. The data will also need a time duration or period in common, such as monthly. In addition, there should be common data fields that allow for the detection of change in a given field from one time duration to the next. (It may be noted that the timestamp on each file may substitute for the time duration data, since a time stamp can be used to calculate the period from one data set to another.) Once the historical data is formatted correctly, the steps in constructing the delta database as shown in FIG. 11 are to identify and set up a base or "foundation" file at step 106; create "change" files for each time duration (such as monthly) at step 108; and create from this a "master" file at step 110. For clarity, the time period of monthly will be assumed in the following examples.

For the foundation file construction at step 106, a copy of the first (i.e., oldest) monthly file constructed at step 102 serves as the foundation from which the rest of the database grows. Each field (other than the identifier field) is replaced with a numeric representation of the value and named, for example, "old_" and the field name, as shown in FIG. 10. For example, an income field has values "A" through "G" corresponding to income ranges, such as $0-15,000 for "A" and $100,000-$125,000" for "G." It is converted to "old_" values with numeric midpoints of those income ranges. Only the identifiers and "old_" elements are retained. A new field called "origination_date" may be created, where all records are assigned the date that the file represents. To minimize storage space, this data can be stored using the same abbreviated value used in the concatenated fields that will be created, for example, in the form "A3P050" to store the date, direction, and magnitude, so this example would be "A3."

A copy of the second monthly file from step 102 is matched to the foundation file using the identifier. Any identifiers that did not appear in the original file are kept, and thus the foundation file grows. New records are assigned the "origination_date" of the newer file. Any field contained in the second file that corresponds to one from the original foundation file is named "new_" and the field name, so that it can be paired with the old value. Any field appearing for the first time is renamed "old_" and the field name. The foundation file has only one record per identifier, representing the most recent combination of "old_" and "new_" for each field. Thus fields expected on the foundation file include the identifier, "old_" field, "new_" field, and origination_date.

Where the corresponding "old_" and "new_" fields have different values, a change occurred, so those are output to form the basis of a change file at step 108. The date is preferably included in the name of the change file so that the change time period is clear. A new set of fields named "dv_" and the field name are created, representing the delta string that will appear in the final delta database, as shown in FIG. 10. This consists of the date of the new value, the direction of change (P or M), and magnitude, which is a change value such as the delta value between the "old_" and "new_" values. The calculation of the magnitude values may generally be performed in advance of concatenating this string together, and those values may be dropped once the concatenation is complete. Where the "old_" and "new_" fields have the same value, and thus no change occurred, the corresponding "dv_" field is left blank; this can occur because a change is not required in all fields in order for a record to appear in the change file. This process of updating the foundation file and then outputting a new change file is repeated for each monthly file.

The process of creating the master file at step 110 begins with a copy of the oldest change file. A new "counter" field, as shown in FIG. 10, is created and assigned a value of 1 for all records. The next change file is stacked on top, so that identifiers appearing in both change files will have two records. The newer records have a counter value of 1, and the older records are assigned a counter value of 2. For records with a counter value of 1, any field where the "dv_" field is blank due to no previous change is assigned the "old_," "new_," and "dv_" of the record for which the counter value is 2. If all data from the record with a counter value of 2 can be moved up to the record with the counter value of 1, then the record with the counter value of 2 is dropped. The record with the counter value of 2 is only kept where there was a previous change in the same field. This process is repeated with each subsequent change file, and thus records may be assigned higher change values. This process is repeated at decision step 112 until all historical data that was formatted into monthly files at step 102 has been included in the process, at which point the processing ends at step 114.

A computer system may be utilized for implementing certain embodiments for ranking various data sets based on delta values. The computer system may include a processor or series of processors for executing instructions consistent with the disclosed embodiments. The processor or processors may be in communication with various components of the computer system over a data bus. The computer system may include a storage device for storing the aggregate data described in certain embodiments, and/or the results of the processing described herein. RAM memory may be used by the processor or processors for storing active data during the execution of instructions. The computer system preferably also includes one or more input devices, for example, a keyboard and a mouse, as well as one or more output devices, such as one or more displays or monitors. A network interface may allow the computer system to be connected to a network, such networks including the Intranet, an extranet, a local area network (LAN), and/or a wide area network (WAN). The computer system may also include removable storage, such as a CD-ROM, DVD-ROM, and USB flash drive. The computer system may also be in communication with a printer or a fax machine. Program instructions for executing methods and implementing systems according to certain embodiments may be stored in the storage device or removable storage, or may be received through the network interface. These program instructions may be executed by the processor or processors.

In particular, the delta database described herein is particularly well suited for partitioning during processing among multiple processors in a multi-processor system. In one non-limiting example, processing to construct the delta database may be partitioned (the master file, change files, and/or foundation files may be partitioned) on the last digit of the household identifier or link. In this way, ten different partitions may be created with roughly the same number of records in each in order to efficiently distribute processing in a multi-processor system. Further, it may be seen that different types of computer systems may be employed for different aspects of the invention. It is known in the art that various computer hardware systems may be capable of very fast execution but less susceptible to partitioning and more susceptible to errors or time-out problems. Other systems may be slower if measured strictly in their number of operations per time unit, but may be able to more efficiently perform partitioned parallel processing, and may be less susceptible to errors. Thus, in one particular example, a periodic "roll-up" (as, for example, a monthly roll-up) may be performed on the slower system more amenable to parallel processing and more fault tolerant, while analytics that are performed using the database after the roll-up is completed may be performed on the faster, single processor system.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as a combination of hardware and software or in hardware alone. Examples of hardware include computing or processing systems, including personal computers, servers, laptops, mainframes, supercomputers, microprocessors, microcontrollers, and the like. Additionally, although aspects of the disclosed embodiments are described as being stored in memory, one skilled in the art will appreciate that these aspects can also be stored on other types of computer-readable media, such as secondary storage devices, for example, hard disks, CD-ROM, DVD-ROM, or other forms of RAM or ROM, or solid state devices such as USB media.

Computer programs based on the written description and disclosed methods are within the skill of an experienced developer. The various programs or program modules can be created using any of the techniques known to one skilled in the art or can be designed in connection with existing software. For example, database software such as Oracle may be used, and relational databases such as SQL or Access. Program sections or program modules can be designed in or by means of Hadoop, SAS, R, C, Java, C++, and HTML.

Figure 12:
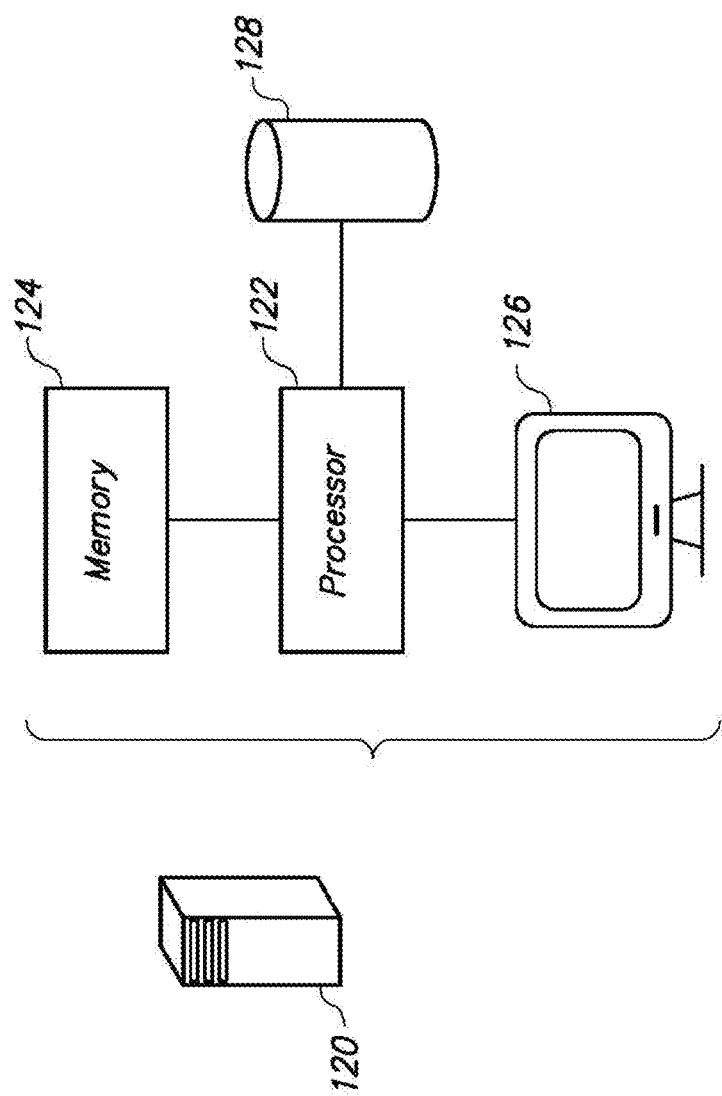
FIG. 12 is a diagram of a computer system implemented according to certain embodiments of the present invention.

Certain embodiments of the system for computing delta values and constructing and/or housing the delta database are implemented as a computing device 120 as illustrated in FIG. 12, which is programmed by means of instructions to result in a special-purpose computing device to perform the various functionality described herein. Computing device 120 may be implemented in a number of different forms. For example, it may be implemented as a standard computer server as shown in FIG. 12, or as a group of such servers. Computing device 120 may also be implemented as part of a rack server system, as are well known in the art. Computing device 120 may be a multi-processor system or single processor system, for various applications related to the various embodiments as explained herein. A separate computing device 120 may be used for different processes; for example, a multi-processor computing device 120 may be used for constructing the roll-up of the delta database, while a separate single-processor computing device 120 may be use for analytics.

Computing device 120 includes microprocessor 122 (which may be multiple parallel computing microprocessors), memory 124, an input/output device such as display 126, and storage device 128, such as a solid-state drive or magnetic hard drive. Each of these components is interconnected with the others using various buses, and several of the components may be mounted on a common PC board or in other manners as appropriate.

Microprocessor 122 may execute instructions within computing device 120, including instructions stored in memory 124. Microprocessor 122 may be implemented as a single microprocessor, or may be implemented as a chipset that includes separate and multiple analog and/or digital processors. Microprocessor 122 may provide, for example, for coordination of the other components of computing device 120, such as control of user interfaces, applications run by computing device 120, and wireless communication by computing device 120.

Memory 124 stores information within computing device 120. The memory 124 may be implemented as one or more of a computer-readable medium or media, a volatile memory unit or units such as flash memory or RAM, or a non-volatile memory unit or units such as ROM. Memory 124 may be partially or wholly integrated within microprocessor 122, or may be an entirely stand-alone device in communication with microprocessor 122 along a bus, or may be a combination such as on-board cache memory in conjunction with separate RAM memory. Memory 124 may include multiple levels with different levels of memory 124 operating at different read/write speeds, including multiple-level caches. In one implementation, a computer program product is tangibly embodied in an information carrier. The computer program product contains instructions that, when executed, perform one or more processes, such as those described above.

Display 126 provide for interaction with a user, and may be implemented, for example, as a monitor for displaying information to the user, in addition to a keyboard and a pointing device, for example, a mouse, by which the user may provide input to the computer. Other kinds of devices may be used to provide for interaction with a user as well.

Various implementations of the systems and methods described herein may be realized in digital electronic circuitry, integrated circuitry, computer hardware, firmware, software, and/or combinations thereof. These various implementations may include implementation in one or more computer programs that are executable and/or interpretable on a programmable system including at least one programmable microprocessor 122, which may be special or general purpose, coupled to receive data and instructions from, and to transmit data and instructions to, a storage system, at least one input device, and at least one output device. These computer programs (also known as programs, software, software applications or code) include machine instructions for programmable microprocessor 122, and may be implemented in a high-level procedural and/or object-oriented programming language, and/or in assembly/machine language. As used herein, the terms "machine-readable medium" and "computer-readable medium" refer to any computer program product, apparatus and/or device (for example, magnetic discs, optical disks, RAM memory, and programmable logic devices) used to provide machine instructions and/or data to a programmable processor, including a machine-readable medium that receives machine instructions.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain embodiments that are intended to be exemplary only and not limiting to the full scope of the present invention, as set forth in the appended claims.

The invention claimed is:

1. A computer-implemented method for calculating at one or more processors a delta value representing a change between a first value for a consumer data element and a second value for the consumer data element, comprising the steps of:
 a. receiving from a computer-readable medium in communication with the one or more processors the first value of the consumer data element and the second value of the consumer data element;
 b. calculating at the one or more processors a first difference between the second value and the first value of the consumer data element;
 c. calculating at the one or more processors a ratio between (i) an absolute value of a smaller value, wherein the smaller value is a lesser of the first value of the consumer data element and the second value of the consumer data element, and (ii) an absolute value of a larger value, wherein the larger value is a greater of the first value of the consumer data element and the second value of the consumer data element;
 d. multiplying at the one or more processors the ratio of step (c) by an asymptote to create a compression value for the consumer data element;
 e. adding at the one or more processors the first difference between the second value and the first value of the consumer data element calculated at step (b) to the compression value for the consumer data element calculated at step (d) to create the delta value for the consumer data element;
 f. creating a concatenated string comprising the delta value;
 g. storing the concatenated string in a database; and
 h. repeating steps (a) through (g) for a plurality of consumer data elements wherein the database comprises a plurality of records each comprising a field comprising the concatenated string corresponding to that delta value.

2. The computer-implemented method of claim 1, wherein the consumer data element is historical consumer data or longitudinal consumer data.

3. The computer-implemented method of claim 2, wherein the first value of the consumer data element is an old value for the consumer data element, and the second value of the consumer data element is a new value for the consumer data element.

4. The computer-implemented method of claim 1, further comprising the steps of:
 a. calculating at the one or more processors a second difference between the first value and the second value of the consumer data element by subtracting the second value from the first value; and
 b. multiplying at the one or more processors the second difference by the ratio between the absolute value of the smaller value and the absolute value of the larger value.

5. The computer-implemented method of claim 4, further comprising the step of determining at the processor if the second value of the consumer data element is positive and the first value of the consumer data element is negative, or the second value of the consumer data element is negative and the first value of the consumer data element is positive, and if so calculating the delta value by determining an absolute value between the first value of the consumer data element and the second value of the consumer data element.

6. The computer-implemented method of claim 1, wherein the asymptote comprises an asymptote value between zero and one inclusively.

7. The computer-implemented method of claim 6, further comprising the step of calculating the asymptote based on an experimental data set.

8. The computer-implemented method of claim 7, wherein the step of calculating the asymptote based on an experimental data set comprises the steps of:
 a. receiving a set of experimental inputs;
 b. for each of the experimental inputs, calculating a predicted result for each of a plurality of potential asymptotes;
 c. calculating a measurement criteria for each of the plurality of potential asymptotes; and
 d. based on the measurement criteria, selecting one of the potential asymptotes as the asymptote.

9. The computer-implemented method of claim 8, further comprising the step of selecting the measurement criteria from a plurality of potential measurement criteria.

10. The computer-implemented method of claim 9, wherein one of the plurality of potential measurement criteria is a Least Squares method.

11. The method of claim 1, wherein the concatenated string further comprises a representation of a date.

12. The method of claim 11, wherein the representation of a date consists of a single letter character and a single number character.

13. The method of claim 11, wherein the concatenated string further comprises a representation of a direction of change.

14. The method of claim 13, wherein the representation of a direction of change comprises a single character.

15. The method of claim 1, wherein each record further comprises an entity identifier, wherein the one or more processors comprises a plurality of processors in a multi-processor system, and further comprising the step of assigning each of the records to a processor from among the plurality of processors based on a value of the entity identifier in such record.

16. A computer program product for calculating a delta value, the computer program product being stored on a non-transitory tangible computer-readable medium and comprising instructions that, when executed, cause a computer system comprising one or more processors or multi-processors to:
 a. receive from a computer-readable storage medium a first value of a data element and a second value of a data element;
 b. calculate a first difference between the first value and the second value of the data element;
 c. calculate a ratio between the first value and the second value of the data element;
 d. multiply the ratio between the first value and the second value of the data element by an asymptote to create a compression value for the data element; and
 e. add the first difference to the compression value to create a sum comprising the delta value for the data element;
 f. create a concatenated string comprising the sum;
 g. store the concatenated string in a database; and
 h. repeat steps (a) through (g) for a plurality of data elements wherein the database comprises a plurality of records each comprising a field comprising the concatenated string corresponding to that delta value.

17. The computer program product of claim 16, wherein the second value of the data element is not equal to the first value of the data element such that one of the first and second values of the data element is a lower value and one of the first and second values of the data element is a higher value, and wherein the computer program product further comprises instructions that, when executed, cause the computer system to calculate a ratio between the second value and the first value of the data element comprises the step of dividing an absolute value of the lower value of the data element by an absolute value of the higher value of the data element.

18. The computer program product of claim 17, wherein the computer program product further comprises instructions that, when executed, cause the computer system to calculate a second difference between the first value and the second value of the data element by subtracting the second value from the first value and multiply the second difference by the ratio between the second value and the first value of the data element.

19. The computer program product of claim 18, wherein the computer program product further comprises instructions that, when executed, cause the computer system to determine if the second value of the data element is positive and the first value of the data element is negative, or the second value of the data element is negative and the second value of the data element is positive, and if so calculate the delta value by determining an absolute value between the first value of the data element and the second value of the data element.

20. The computer program product of claim 16, wherein the asymptote comprises an asymptote value between zero and one inclusively.

21. The computer program product of claim 20, wherein the computer program product further comprises instructions that, when executed, cause the computer system to store a record in a delta value database comprising a plurality of records each corresponding to a data element change.

22. The computer program product of claim 21, wherein at least one of the records in the delta value database comprises a time field and a delta value field.

23. The computer program product of claim 22, wherein at least one of the records in the delta value database further comprises a direction field.

24. The computer program product of claim 23, wherein the record comprises a concatenated string.

25. The computer program product of claim 24, wherein the direction field comprises a single character corresponding to a positive or negative direction of change associated with the corresponding data element.

26. The computer program product of claim 16, wherein the concatenated string further comprises a representation of a date.

27. The computer program product of claim 26, wherein the representation of a date consists of a single letter character and a single number character.

28. The computer program product of claim 26, wherein the concatenated string further comprises a representation of a direction of change.

29. The computer program product of claim 28, wherein the representation of a direction of change comprises a single character.

30. The computer program product of claim 16, wherein each record further comprises an entity identifier, wherein the one or more processors comprises a plurality of processors in a multi-processor system, and wherein the computer program product further comprises instructions that, when executed, cause the computer system to assign each of the records to a processor from among the plurality of processors based on a value of the entity identifier in such record.

* * * * *